United States Patent Office 3,726,890
Patented Apr. 10, 1973

3,726,890
PROCESS FOR THE PRODUCTION OF HIGH PURITY BENZTHIAZYL-SULPHENAMIDES
Gottfried Gollmer and Hermann Wolz, Cologne, and Adolf von Friedrich, Leverkusen, Germany, assignors to Farbenfabriken Bayer Aktiengesellschaft, Leverkusen, Germany
No Drawing. Filed July 20, 1970, Ser. No. 56,705
Claims priority, application Germany, Aug. 8, 1969, P 19 40 365.7
Int. Cl. C07d 91/44
U.S. Cl. 260—306.6 A                 1 Claim

ABSTRACT OF THE DISCLOSURE

Improvement in the process of producing benzthiazyl-sulphenamides by the oxidative condensation of 2-mercapto-benzthiazole with an amine in stoichiometric or in excess quantity wherein benzthiazyl-sulphenamide product is washed with a 10 to 50% by volume aqueous cyclohexylamine solution to improve the purity thereof.

---

The present invention is concerned with a working-up process in the production of benzthiazyl-sulphenamides. When using commercial grade mercaptobenzthiazole for the preparation of sulphenamides, for example, N-cyclohexyl, N-t-butyl and other S-benzthiazyl-sulphenamides, products are formed which still contain impurities of various types. These impurities cause a reduction in the stability in storage of the sulphenamides, especially under tropical climatic conditions. For example, the content of an originally approximately 95% N-cyclohexyl-S-benzthiazyl-sulphenamide at high temperature and air humidity (50° C., 50% relative air humidity) falls after 14 days to below 80%, whereas pure product remains practically stable under the same conditions, (loss about 1%).

Proceses for purifying technical sulphenamides are so far unknown.

In experiments concerned with subsequently purifying technical sulphenamides, conventional methods, such as the recrystallisation from solvents, caused too high losses of substance, even at low temperatures, because of the very good solubility, or even resulted in rapid decomposition of the products. Simple washing with aqueous solvent mixtures, for example, alcohols, ketones and a number of amines, scarcely improved the quality of the sulphenamides.

It has now been found that a pure benzthiazylsulphenamide can be obtained from the technical benzthiazyl-sulphenamides produced by oxidative condensation of 2-mercaptobenzthiazole with amines, if the technical benzthiazyl-sulphenamides are extracted with a 10 to 50% by volume aqueous cyclohexylamine solution.

It was surprising that the impurities of the sulphenamides could be selectively washed out by using aqueous cyclohexylamine solution, while the sulphenamides are only insignificantly dissolved.

By way of example, a sample of N-cyclohexyl-S-benzthiazyl-sulphenamide washed with 60% methanol could be improved in content only from 91.5% to 92.5%, whereas using the same sample and employing the process according to the invention, the contents rose from 91.5% to 98.8%.

The purification is carried out by the technical sulphenamide being well-stirred with 10 to 50% by volume aqueous cyclohexylamine solution, it being possible to use 1.5 to 2.5 litres of the cyclohexylamine solution per kilo of the sulphenamide, depending on the degree of contamination. The suitable quantities can easily be established by a preliminary test. After about half an hour, the mixture is suction-filtered, washed with the cyclohexylamine solution and then with water and dried. The impurities of the technical sulphenamides can be separated out from the mother liquor and the washing waters by acidification. The aqueous solution can be used for the production of N-cyclohexyl-S-benzthiazyl-sulphenamide or the cyclohexyl-amine can be recovered therefrom by extraction, after adjusting the pH value to 13.

The process can be carried out continuously. For this purpose, the moist product forming at the time of producing the sulphenamide can for example be allowed to drop continuously into a stirrer-type vessel, into which simultaneously is allowed to run such a quantity of water and cyclohexylamine that a 10 to 50% by volume aqueous cyclohexylamine solution is formed.

From the stirrer type vessel, the suspension is conducted to a filter, on which the product is separated, washed and from which it thereafter passes for drying.

The pure sulphenamides produced by the process according to the invention are especially suitable for use in countries having a tropical climate. They are used in the normal manner by addition to rubber mixtuers in quantities of 1–2% and subsequent heating to temperatures of for example about 140° C. (see for example, U.S. Pat. No. 2,490,518, James F. Maud (Monsanto Chemical)).

The commercial grade mercaptobenzthiazole can for example be obtained by reacting aniline with sulphur and carbon disulphide at a temperature above 200° C.

For the preparation of the benzthiazole sulphenamides, it is possible to use as amines primary or secondary amines, for example, ethylamine, diethylamine, butylamine, dimethylamine, piperidine, methyl-butylamine or cyclohexylamine.

The reaction of the mercaptobenzthiazole with the amines can take place in the usual way, for example, by the mercaptobenzthiazole being suspended in water and being reacted with the stoichiometric quantity or an excess of amine. Thereafter, by the addition of oxidants which are known per se, such as chlorine belaching solution, while stirring well, the condensation of the mercaptobenzthiazole with the introduced amine is completed by oxidation.

EXAMPLES 1–7

The technical sulphenamides listed in the following table were each stirred with 140 ml. of a 20% by volume aqueous cyclohexylamine solution and suction-filtered after 30 minutes, washed with 70 ml. of the same solution and then with water, and dried.

| Example number | Technical sulphenamide used | Quantity (g.) | Content (percent) | Yield quantity (g.) | Content (percent) |
|---|---|---|---|---|---|
| 1 | N-cyclohexyl-S-benzthiazyl-sulphenamide. | 74.2 | 89 | 66.3 | 98.6 |
| 2 | do | 76.5 | 87.8 | 67.2 | 98.7 |
| 3 | do | 81 | 87.8 | 71.4 | 98.7 |
| 4 | do | 80 | 86.5 | 69.5 | 98.2 |
| 5 | do | 77.4 | 99.1 | 76.8 | 99.2 |
| 6 | N-t-butyl-S-benzthiazylsulphenamide. | 70.5 | 94 | 66 | 99.3 |
| 7 | do | 69.5 | 99.1 | 68.9 | 99.2 |

EXAMPLE 8

50 g. of 89.5% N-cyclohexyl-S-benzthiazyl-sulphenamide are suspended with 100 ml. of a 10% by volume aqueous cyclohexylamine solution, suction filtered after 30 minutes, washed with 50 ml. of 10% by volume cyclohexylamine solution and then with water, and dried. Yield: 48 g. of 92.5% N-cyclohexyl-S-benzthiazyl-sulphenamide.

EXAMPLE 9

50 g. of 89.5% N-cyclohexyl-S-benzthiazyl-sulphenamide are stirred with 100 ml. of a 50% by volume aqueous cyclohexylamine solution, suction-filtered after 30 minutes, washed with 30 ml. of the same solution and thereafter with water.

Yield: 41 g. of 98.9% N-cyclohexyl-S-benzthiazyl-sulphenamide.

EXAMPLE 10

850 kg./h. of moist, commercial grade N-cyclohexyl-S-benzthiazyl-sulphenamide, which still contains 350 kg./h. of water, are continuously stirred in a stirrer-type vessel with a capacity of 500 ml. with 450 l./h. of water and 200/l./h. of cyclohexylamine. The mixture is transferred to another stirrer-type vessel with a capacity of 1000 litres and passes from there to a continuously operating filter in which the solids are separated from the mother liquor, washed with 500 l./h. of 20% by volume of cyclohexylamine solution and thereafter with water and supplied to a drier. The filtrates are acidified, clarified and supplied for the production of commercial grade N-cyclohexyl-S-benzthiazyl-sulphenamide.

We claim:

1. In the process of producing a benzthiazyl-sulphenamide by oxidative condensation of 2-mercaptobenzthiazole with a primary or secondary amine present in at least a stoichiometric quantity and recovering benzthiazyl-sulphenamide product, the improvement comprising extracting each kilo of said benzthiazyl-sulphenamide product with 1.5 to 2.5 liters of a 10 to 50% by volume aqueous cyclohexylamine solution.

References Cited

UNITED STATES PATENTS 2,268,467  12/1941  Ashworth _____ 260—306.6 A

ALEX MAZEL, Primary Examiner

R. J. GALLAGHER, Assistant Examiner